(12) United States Patent
Matsui

(10) Patent No.: US 12,533,719 B2
(45) Date of Patent: Jan. 27, 2026

(54) METHOD FOR MANUFACTURING USEFUL PRODUCTS CONTAINING CARBONIZED SOLIDS BY TREATING ORGANIC WASTES CONTAINING HEAVY METALS

(71) Applicant: MATSUI CONSULTING CO., LTD., Kyoto (JP)

(72) Inventor: Saburo Matsui, Kyoto (JP)

(73) Assignee: MATSUI CONSULTING FIRM CO., LTD., Kyoto (JP)

( * ) Notice: Subject to any disclaimer, the term of this patent is extended or adjusted under 35 U.S.C. 154(b) by 563 days.

(21) Appl. No.: 17/928,509

(22) PCT Filed: Jul. 28, 2022

(86) PCT No.: PCT/JP2022/023215
§ 371 (c)(1),
(2) Date: Nov. 29, 2022

(87) PCT Pub. No.: WO2023/007957
PCT Pub. Date: Feb. 2, 2023

(65) Prior Publication Data
US 2024/0226976 A1    Jul. 11, 2024

(30) Foreign Application Priority Data

Jul. 28, 2021    (JP) ................................ 2021-122896

(51) Int. Cl.
*B09B 3/70* (2022.01)
*B09B 3/38* (2022.01)
(Continued)

(52) U.S. Cl.
CPC .................. *B09B 3/70* (2022.01); *B09B 3/38* (2022.01); *B09B 3/40* (2022.01); *C05B 13/06* (2013.01); *B09B 2101/25* (2022.01)

(58) Field of Classification Search
None
See application file for complete search history.

(56) References Cited

U.S. PATENT DOCUMENTS 5,252,127 A * 10/1993 Pichat ................... C02F 11/008
106/796

FOREIGN PATENT DOCUMENTS

| CN | 102060456 A | * | 5/2011 | ........... C04B 18/106 |
| JP | 2008000689 A | * | 1/2008 | |
| WO | WO-2013150660 A1 | * | 10/2013 | ............... B09B 3/25 |

OTHER PUBLICATIONS

Machine Translation JP2008000689 (Year: 2008).*
Machine Translation CN-102060456 (Year: 2011).*
Machine Translation WO2013150660 (Year: 2013).*

* cited by examiner

*Primary Examiner* — Michael Forrest
(74) *Attorney, Agent, or Firm* — Renner, Kenner, Grieve, Taylor, Bobak & Weber Co. LPA

(57) ABSTRACT

[Problem] To provide a method for producing useful substances, which converts organic waste containing heavy metals into harmless substances such as fertilizers and soil conditioners by carbonizing organic matter while detoxifying heavy metals.
[Solution] The present invention is a method for producing a useful material, said method comprising treating an organic waste in which heavy metals are mixed to produce a carbonized material containing weighed material. The organic waste in which the heavy metals are mixed is treated by dry carbonization of an organic waste to which a Ca component starting material and a $SiO_2$ component starting material, which are topalmorite starting materials, are added in amounts sufficient to contain the mixed heavy metals in topalmorite crystals; a charcoal-forming step of dry carbon- (Continued)

izing the waste, carbonizing the organic waste to form a carbide; the carbide formed in this carbide forming step and the topamolite raw material are charged into a reaction vessel while maintaining the high temperature state in the previous step, and slowly cooled in the presence of water with stirring to form the organic material; a heavy metal confinement step of forming a topamolite crystal mineral in which heavy metals mixed in the organic waste are confined, and forming a slurry in which the carbide and the topamolite crystal mineral are dispersed; and drying or dehydrating the slurry formed in the previous step to produce a useful substance containing a carbide containing the topamolite crystal mineral.

16 Claims, 1 Drawing Sheet

(51) Int. Cl.
*B09B 3/40* (2022.01)
*B09B 101/25* (2022.01)
*C05B 13/06* (2006.01)

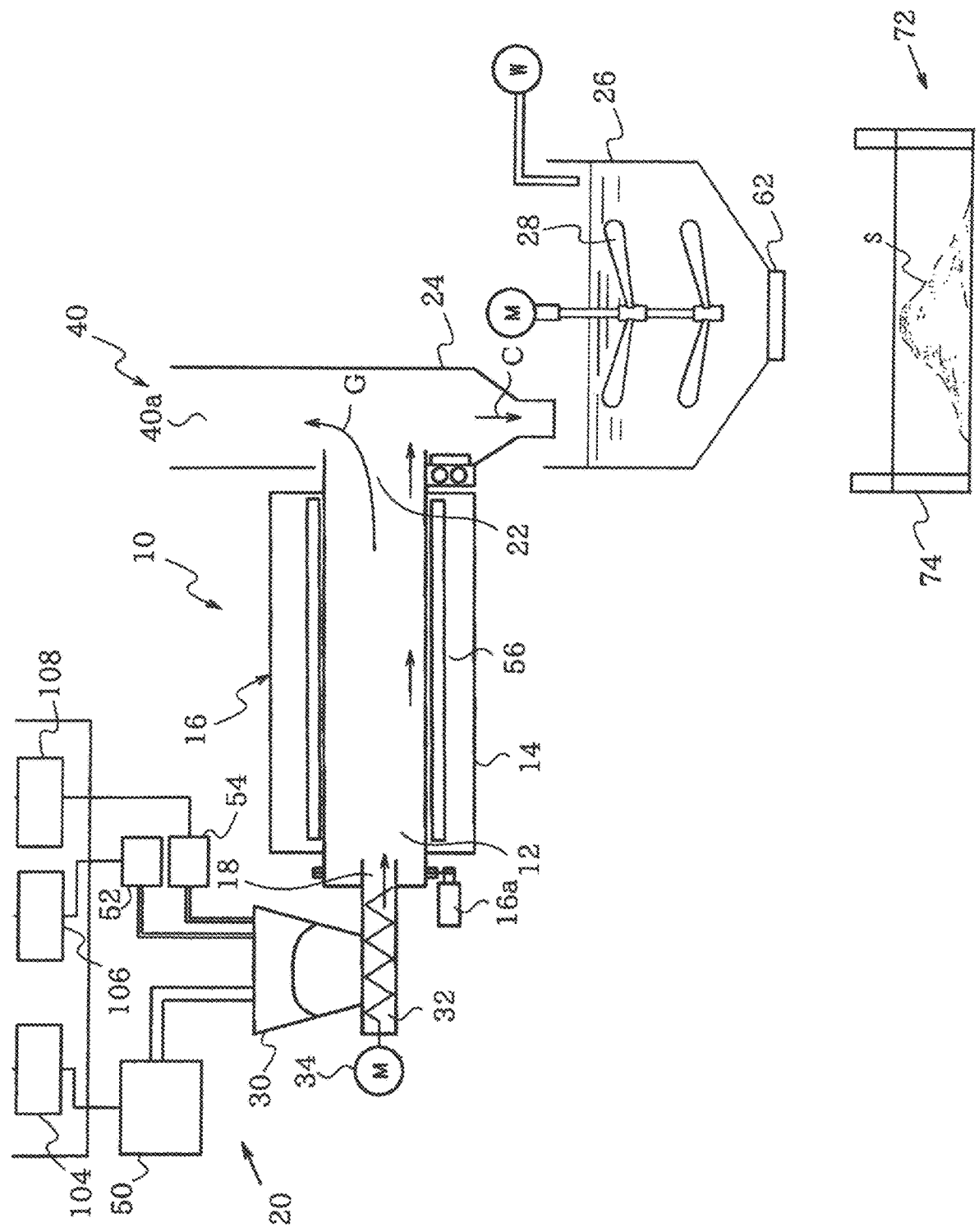

METHOD FOR MANUFACTURING USEFUL PRODUCTS CONTAINING CARBONIZED SOLIDS BY TREATING ORGANIC WASTES CONTAINING HEAVY METALS

TECHNICAL FIELD

This invention relates to a method for manufacturing useful products, in particular, a method for manufacturing useful products (e.g., fertilizers, soil conditioners, etc.) containing carbonized solids by treating organic waste containing heavy metals.

BACKGROUND TECHNOLOGY

It is well known that organic wastes, for example, organic sludge consisting of food industry waste, contains a large amount of nitrogen group elements such as phosphorus (phosphorus compounds) and nitrogen. Moreover, it is also known that these elements in the sludge become even more abundant when they are treated by the activated sludge method.

As for effective utilization of nitrogen group elements contained in organic sludge, a method to carbonize organic residues such as food residues from food factories and paper sludge from paper mills in a nearly closed incinerator by complete combustion gas filled in the furnace and to use this carbonized material as soil improvement material (JP-A-H10-330745) and others are known.

Or, a method is known to mix organic sludge containing nitrogen components with a hygroscopic phosphorus compound, dry it, and use it as a fertilizer.

Thus, it has been proposed to utilize organic sludge as a raw material for soil conditioners or fertilizers by taking advantages of phosphorus, phosphorus compounds, nitrogen, and other components contained in organic sludge that are necessary for growing agricultural products.

In reality, however, the starting material sludge has various qualities and contains a proper amount of beneficial substances, but it may also contain toxic substances (e.g., heavy metals). Therefore, in order to use the products, it is necessary to confirm that the amount of hazardous substances is below a certain level as defined by the elution test specified in JIS K0102. In addition, when the starting material is sewage sludge, there is considerable social resistance to reusing the resources obtained by recycling it as a fertilizer. Therefore, they are not actively accepted.

In this respect, it has become common practice for households to compost food residues and reuse them as fertilizer without any resistance.

In other words, it is necessary to recognize the current situation in which reuse tends to be easily carried out as long as the qualities of the starting material are acceptable.

Based on this understanding of the current situation, as a purpose to provide a treatment method and a treatment facility in which the organic sludge treated by the activated sludge method, containing no heavy metals and containing large amounts of phosphorus and phosphorus compounds is treated by drying, carbonizing, or ashing to obtain treated products contain large amounts of phosphorus and phosphorus compounds and can be obtained and reused as a soil conditioner and fertilizer, JP-A-2002-1395 proposes a method for treating organic sludge, etc., which is composed of the following structure.

In other words, the method of treating organic sludge proposed in this bulletin is characterized by the thermal treatment of sludge treated by the activated sludge method and free of heavy metals to obtain a dried, carbonized, and ashed products containing phosphorus or phosphorus compounds.

As described above, the technologies described in the above published gazette are related to the treatment technology of organic sludge, and in particular, the technology to treat organic sludge so that it can be reused as a soil conditioner and fertilizer. In particular, it is a technology to treat organic sludge so that it can be reused as a soil conditioner and fertilizer.

However, paragraph [0014] of this publication states that if the sludge contains heavy metals, the heavy metals in the sludge are removed and the sludge is heat treated in the condition of free of heavy metals. However, the above published gazette does not describe any specific technology for removing heavy metals from organic waste (sludge).

On the other hand, in JP-A-2004-250284, the subject is to remove heavy metals from organic wastes reliably and efficiently, and to lower the price and maintain the quality of liquid fertilizers, which are the reused products of the organic wastes. The following invention is proposed for the objective of providing a method for producing liquid fertilizers from organic waste containing heavy metals that solves the above-mentioned problem.

In a concrete manner, the technical means proposed in the above-mentioned JP-A-2004-250284 is characterized by mixing and agitating organic wastes and plant-based materials and steaming them at high temperature and pressure to separate them into a liquid body constituting a liquid fertilizer and an undecomposed solid carbide derived from plant-based materials, while allowing heavy metals contained in the organic waste to be adsorbed and removed by the undecomposed solid carbide. Heavy metals contained in organic waste are removed by adsorption on the undecomposed solid carbide.

By the way, the adsorption and fixation of said heavy metals to carbonized products does not take place in the state of metal alone, but in the state of metal sulfide and metal oxide, therefore, in the method of heavy metal removal described in the above publication, at least some arsenic remains in the liquid fertilizer.

On the other hand, if we look at carbonized products that have adsorbed heavy metals, these carbonized materials cannot be used as fertilizers or soil conditioners. This is because the adsorbed heavy metals may be leached out over time or by the action of strong acids.

PRIOR ART DOCUMENTS

Patent Document

[Patent Document 1] JP-A-H10-2482
[Patent Document 2] JP-A-2002-1395
[Patent Document 3] JP-A-2004-250284

SUMMARY OF THE INVENTION

Problem to be Solved by the Invention

The object of the present invention is to provide a method for manufacturing useful products by carbonizing organic wastes containing heavy metals while detoxifying the heavy metals to produce non-toxic, useful products that are fertilizers, soil conditioners, and the like.

Means to Solve the Above Problem

The above subject matter is achieved by the method for manufacturing useful products in the configurations shown in (1) through (9) below.

(1) Method for manufacturing useful products containing carbonized materials by treating organic wastes containing mixed heavy metals, wherein the method comprises: a step of adding Ca component raw material and SiO2 component raw material, which are tobermorite raw materials, to the organic waste containing mixed heavy metals in an amount sufficient to trap the mixed heavy metals within the tobermorite crystals;
a step of dry-carbonizing the organic waste to which the tobermorite materials are added, to carbonize the organic waste to form carbonized materials;
a step of feeding the carbonized materials formed in the carbonized material formation step and the tobermorite raw material s into the reaction vessel while maintaining the high temperature conditions of the previous process,
and stirring and cooling slowly those in the presence of water to form tobermorite crystal minerals in which the heavy metals mixed in the organic waste are contained to form a slurry in which carbonized material and tobermorite crystal minerals are dispersed; and
and a step of drying or dehydrating the slurry formed in the previous process to manufacture useful products containing carbonized material in which the tobermorite crystal minerals are intermixed.

(2) Method for manufacturing useful products containing carbonized materials by treating organic wastes containing mixed heavy metals, wherein the method comprises: a step of dry-carbonizing the organic wastes to carbonize the organic waste to form carbonized materials;
a step of feeding the carbonized materials formed in the carbonized material formation step into the reaction vessel while maintaining the high temperature conditions of the previous process, and adding Ca component raw material and SiO2 component raw material, which are tobermorite raw materials, in an amount sufficient to trap the mixed heavy metals within the tobermorite crystals, and stirring and cooling slowly those in the presence of water to form tobermorite crystal minerals in which the heavy metals mixed in the organic waste are contained to form a slurry in which carbonized material and tobermorite crystal minerals are dispersed; and
and a step of drying or dehydrating the slurry formed in the previous process to manufacture useful products containing carbonized material in which the tobermorite crystal minerals are intermixed.

(3) The method for manufacturing useful products according to said (1) or (2), wherein calcium phosphate is contained in the useful products when the organic waste contains phosphorus (4) The method for manufacturing useful products according to any one of said (1)-(3), wherein the heavy metals are at least one selected from chromium, lead, cadmium, arsenic, mercury, zinc, copper, and nickel.

(5) The method for manufacturing useful products according to any one of said (1)-(4), wherein the amount (A-1) of Ca component and the amount (A-2) of $SIO_2$ component in the organic waste containing mixed heavy metals are determined by analyzing the content of Ca component and the content of $SiO_2$ component (A-1) in the waste, calculating amounts of a Ca component (B-1) and a $SiO_2$ component (B-2) sufficient to form $5CaO·6SiO_2·5H2O$ crystals (tobermorite) to contain at least the aforementioned heavy metals in the $5CeO·6SiO2·5H_2O$ crystals (tobermorite) structure during treatment. The required amount (C-1) of Ca component raw material and the required amount (C-2) of $SiO_2$ component raw material are determined by the following formulas (1) and (2), and the treatment is performed by using the required amount (C-1) of Ca component raw material and the required amount (C-2) of SiO2 component raw material, $$[(B-1) - (A-1)] = (C-1) \quad \text{formula (1)}$$

$$[(B-2) - (A-2)] = (C-2). \quad \text{formula (2)}$$

(6) The method for manufacturing useful products according to any one of said (1)-(5), wherein since the heavy metals are sequestered in the $5CaO·6SiO_2·5H_2O$ crystals (tobermorite) in the useful products obtained by the above treatment, the useful products satisfy the soil environmental criteria and/or the special fertilizer criteria.

(7) The method for manufacturing useful products according to any one of said (1)-(6), wherein during the carbonized material formation process, the organic wastes are stirred.

(8) The method for manufacturing useful products according to any one of said (1)-(7), wherein The dry carbonized material processing is performed in a rotary kiln type processing unit.

(9) The method for manufacturing useful products according to any one of said (1)-(8), wherein The heating temperature in the dry carbonization process is 5-600° C.

Effects of the Invention

According to the present invention, harmful heavy metals are incorporated into tobermorite so that they cannot be leached out, thus making it possible to produce useful products that are safe fertilizers, soil conditioners, etc.

BRIEF DESCRIPTION OF DRAWINGS

FIG. 1 is a schematic drawing showing an embodiment of the invention of an apparatus for implementing a method for manufacturing useful products.

EMBODIMENT OF THE INVENTION

FIG. 1 is a schematic drawing showing an example of an apparatus for implementing a method for manufacturing useful products of the present invention. As shown in the FIGURE, the apparatus 10 for producing useful materials in this embodiment produces useful materials, which are carbonized materials that can be used as fertilizers, soil conditioners, and the like by dry carbonizing organic waste, which is the raw material. This manufacturing apparatus 10 comprises a rotary kiln-type carbonizing furnace body 16 formed in a horizontal cylindrical shape with an inner cylinder 12 and an outer cylinder 14, a raw material feeder 20 attached to the side of a raw material inlet 18 of the carbonizing furnace body 16, a hopper 24 installed on the side of the carbonized material outlet 22 of the carbonizing furnace body 16 so as to drop down the transferred carbonized organic waste, and a reaction vessel 26 provided to receive the carbonized material from the hopper 24. The reaction vessel 26 is supplied with water by pump W and has a stirring member 28 that stirs and mixes the received carbonized material. Dry carbonization refers to a method in which, when organic waste is carbonized, even if the organic waste itself retains moisture, the moisture is evaporated and eliminated by applying heat outside the carbonization apparatus (indirectly) or by introducing hot air inside (directly), and the dried organic waste is pyrolyzed in a reducing atmosphere to become carbonized material. In other words, it is different from wet carbonization methods, such as subcritical water (steaming, etc.) carbonization, in which, for carbonization, hot water is provided inside the carbonization apparatus from outside the apparatus.

The feedstock feeder 20 comprises a raw material supply hopper 30 for primary storage of raw material, which is organic waste, a screw conveyor 32 that feeds the raw material in the supply hopper 30 into the carbonizing furnace body 16, and an electric motor 34 that drives the screw conveyor 32.

At the side of the carbonized material outlet 22 of the carbonization harness body 16, a gas discharging tower 40 is also provided to act a dry distillation gas discharge channel 40 a for discharging dry distillation gas G which is generated by carbonization treatment of the raw material of organic waste.

Said raw material feeding apparatus 20 comprises the first feedstock feeder 50 for feeding the raw material which is organic waste such as sludge etc., the second feedstock feeder 52 for feeding Ca content material of the tobermorite, and the third feedstock feeder 54 for feeding SiO$_2$ content material of the tobermorite. Those three feedstock feeders feed needed required raw materials to said raw material supply hopper 30, respectively.

The carbonization harness body 16 is of the type of rotary drum such as rotary kiln type, which conveys the carbonized material to carbonized material outlet 22 side by rotation thereof by the driving power of a drive motor.

Besides, to enhance the conveying action, incline or decline may be provided or screw blades may be equipped on the inner peripheral surface of the body 16. In addition, between the inner cylinder 12 and the outer cylinder 14 of carbonization furnace body 16, a heater 56 is provided, by heat of heater 56, the raw material being the organic waste in Inlet raw material being organic waste is conveyed to the carbonized outlet 22 side while being carbonized so as to discharge it as carbonized products C. Because of using rotary kiln type as the carbonization furnace body 16, there is to heat them evenly and equally, and, for after-going treatment, to enough stir heavy metals, and Ca content raw material and SiO$_2$ content raw material of the tobermorite.

The lower part of the reaction vessel 26 is in the shape of an inverted cone, and has an outlet 60 at its bottom, and this outlet 60 is equipped with an open/close valve 62.

A reserve tank 72 is provided under the vessel 60. When said open/close valve 62 is opened, from the reaction vessel 26 the solution in which the carbonized material and the like is dropped, and the solution is reserved by the reserve tank 72. At the mid part in the vertical direction, a filtering case 74 is provided, and the solution with the carbonized products and the like from discharged and dropped from said reaction vessel 26 is separated to the solid portion and liquid portion by this filtering case 74. Thereby, the solid portion S (or slurry) including the carbonized products and the tobermorite crystal mineral etc. are stored in the filtering case 74, and only separated liquid portion L is passed through the filtering case 74 and stored in the bottom of reserve tank 72.

The first feeder 50 to feed the organic waste material, the second feeder 52 to feed the Ca component raw material of tobermorite, and the third feeder 52 to feed the SiO$_2$ component raw material of tobermorite are connected to a control unit 100 so that the amount of the raw material supplied by each is controlled.

As described below, said control unit 100 comprises a central processing circuit 102 for total control of said raw material feeder 20, a first raw material feeder control circuit 104 for controlling said first raw material feeder 50, a second raw material feeder control circuit 106 for controlling said second raw material feeder 52, a third material feeder control circuit 108 for controlling said third raw material feeder 54.

Next, the function of said central processing circuit 102 of said control apparatus 100 is explained as follows. The central processing circuit 102 of the control unit 100 controls the first raw material feeder control circuit 104, the second feeder control circuit 106, the third feeder control circuit 108 to add to the organic waste (raw material), which is mixed with heavy metals and which is to become a useful carbonized material, tobermorite raw material in an amount sufficient to encapsulate the mixed heavy metals within the tobermorite crystals. This central processing circuit 102 operates based on the following.

First, the content of Ca component (A-1) and the content of SiO$_2$ component (A-2) in the organic waste should be determined by analysis.

In addition, for a given amount of organic waste, the amount of Ca (8-1) and the amount of SiO$_2$ (B-2) sufficient to form 5CaO·6SiO$_2$·5H$_2$O crystals (tobermorite) structure during treatment to encapsel the heavy metals are cariculated.

The following equations (1) and (2) are used to determine the amount (C-1) of Ca component material and the amount (C-2) of SiO$_2$ component material to be added to the organic waste containing interspersed heavy metals.

The first material feeder control circuit 104 then controls said first material feeder 50 to feed said predetermined amount of organic waste (interspersed with heavy metals) to said feeder hopper 30.

$$[(B-1)-(A-1)] = (C-1) \qquad \text{formula (1)}$$

$$[(B-2)-(A-2)] = (C-2). \qquad \text{formula (2)}$$

In the same way, the second raw material feeder control circuit 106 controls said second raw material feeder 52 to feed Ca component material of the added amount (C-1) of is fed into said material feeder hopper 30. Then, the third raw material feeder control circuit 108 controls the third raw material feeder 54 to feed the SiO$_2$ component raw material of the added amount (C-2) to the raw material feed hopper 30.

$$(B-1)-(A-1)] = (C-1) \qquad \text{Formula (1)}$$

$$((B-2)-(A-2)) = (C-2) \qquad \text{Formula (2)}$$

In the above construction, the controller 100 is operated to supply a predetermined amount of organic waste (intermixed with heavy metals) from the first raw material feeder 50 to the raw material feed hopper 30, the calculated amount of Ca component raw material as described above from the second raw material feeder 52 into the hopper 30, and the calculated amount of $SiO_2$ component raw material as described above from the third raw material feeder 54 into the hopper 30.

When a predetermined amount of organic waste and the like are fed into the material input hopper 30, the organic waste and the like are fed into the carbonizing furnace body 16 by the material screw conveyor 32. The carbonizing furnace body 16 is rotated under the driving force of motor 16*a* to transport organic waste and other materials forward. The organic waste is heated at approximately 500-600° C. while moving through the carbonizing furnace body 16. As a result, it is gradually dried and carbonized into carbides, and the dry distillation gas G generated is discharged from the exhaust tower 40. As a result of the above, the carbide formed by the carbonization of organic waste, heavy metals, and tobermorite material would be discharged at the carbonization outlet 22 of the carbonization furnace body 16 at the above-mentioned temperature of about 500-600° C. in the case that the organic waste to be carbonized contains phosphoric acid, such as sewage sludge, raw garbage, livestock manure, etc., this phosphoric acid is separated from the carbonized material during the above carbonization process. In addition, the above carbonization may be by incineration.

Said carbonized material, heavy metals, tobermorite material, and phosphoric acid that may be present are discharged from the carbonized material outlet 22 of the carbonizing furnace body 16 under the temperature conditions described above, and are then fed through the hopper 24 and fed into the reaction vessel 26, which is pre-filled with a predetermined amount of water. If the inside of the reaction vessel 26 is cooled naturally with stirring in this condition, the synthesis of quasicrystals of tobermorite first is initiated at a temperature process between 200° C. and 180° C. From there, a further temperature reduction process up to 130° C. results in the synthesis of stable tobermorite crystals and the formation of tobermorite crystal minerals. At the same time, said phosphoric acid reacts with CaO, the Ca component raw material, to form calcium phosphate. It is important to note that the temperature reduction process from 200° C. to 180° C. is maintained for at least one hour, and further, the temperature reduction process from 180° C. to 130° C. is maintained for at least one hour preferably for 2 to 3 hours. In order to maintain the reaction time, i.e., the temperature state, the reaction vessel 26 may be equipped with a temperature sensor and heating means to maintain the temperature in the preferred range.

By bringing the tobermorite material in the reaction vessel 26 to the 0 temperature state described above, according to the following Equation (3), the Ca component originally contained in the waste, the Ca component newly added, the SiO2 component originally contained in the waste, and $SiO_2$ component newly added react with hydration to produce calcium silicate (tobermorite: $5CaO \cdot 6SiO_2 \cdot 5H_2O$), a stable mineral crystal.

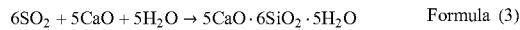

$$6SO_2 + 5CaO + 5H_2O \rightarrow 5CaO \cdot 6SiO_2 \cdot 5H_2O \quad \text{Formula (3)}$$

Tobermorite crystals grow in a layered structure, in which the Si—O tetrahedral layer, Ca O octahedral layer. Si—O tetrahedral layer, and Si—O tetrahedral layer are repeated, and calcium ions are intercalated between the Si—O tetrahedral and Si—O tetrahedral layers.

During the formation process of the layered crystal structure, heavy metals are encapsulated in the layered crystal structure by replacing calcium ions through ion-exchange reactions with calcium ions. In this way, heavy metals are encapsulated in the layered crystal structure of tobermorite, thereby inhibiting their elution.

In this way, the inside of the reaction vessel 26 becomes a solution in which said carbonized products, tobermorite crystal minerals which have completely incorporated heavy metals, and calcium phosphate, are dispersed. After this, when valve 62 is opened, the solution in which said carbonized products, tobermorite crystal minerals which have completely incorporated heavy metals, and calcium phosphate are dispersed, is discharged and falls. At this time, as described above, the solids are received by the filtration box 74, and the liquid content is separated. The solids received in the filtration box 74, such as said carbonized products, tobermorite crystal minerals which have completely incorporated heavy metals, and calcium phosphate can be used as fertilizer, soil conditioner, etc. (useful materials). Meanwhile, the liquid content separated as described above is further dropped and stored in the bottom of storage tank 72. The liquid content stored in this storage tank 72 can be used as liquid fertilizer containing nutrients (nitrogen and potassium).

In the above described process, the tobermorite material was added before the carbonized products formation process. This is because heating the tobermorite materials together with the organic waste brings the tobermorite materials to a high temperature state, enabling the subsequent heavy metals encapsulation process (tobermorite crystal synthesis process) to be carried out efficiently.

Although it requires a longer reaction time than described above, the tobermorite material may be dissolved in advance in water to be placed in the reaction vessel 26, and the carbonized products (containing heavy metals) may be fed into that water and stirred to allow the synthesis reaction to proceed.

The invention claimed is:

1. Method for manufacturing useful products containing carbonized materials by treating organic wastes containing mixed heavy metals, wherein the method comprises:
    adding Ca component raw material and $SiO_2$ component raw material, which are tobermorite raw materials, to the organic waste containing mixed heavy metals in an amount sufficient to trap the mixed heavy metals within tobermorite crystals of the tobermorite raw materials;
    dry-carbonizing the organic waste to which the tobermorite raw materials are added, to carbonize the organic waste to form carbonized materials;
    feeding the carbonized materials formed in the carbonized material formation step and the tobermorite raw materials into a reaction vessel while maintaining the high temperature conditions of the previous process;
    stirring and cooling slowly those in the presence of water to form tobermorite crystal minerals in which the heavy metals mixed in the organic waste are contained to form a slurry in which carbonized material and tobermorite crystal minerals are dispersed; and
    drying or dehydrating the slurry formed in the previous process to manufacture useful products containing carbonized material in which the tobermorite crystal minerals are intermixed.

2. Method for manufacturing useful products containing carbonized materials by treating organic wastes containing mixed heavy metals, wherein the method comprises:
    dry-carbonizing the organic wastes at high temperature to carbonize the organic waste to form carbonized materials;

feeding the carbonized materials formed in the carbonized material formation step into a reaction vessel while maintaining the high temperature conditions of the previous process, and adding Ca component raw material and SiO2 component raw material, which are tobermorite raw materials, in an amount sufficient to trap the mixed heavy metals within tobermorite crystals of the tobermorite raw materials, and stirring and cooling slowly those in the presence of water to form tobermorite crystal minerals in which the heavy metals mixed in the organic waste are contained to form a slurry in which carbonized material and tobermorite crystal minerals are dispersed; and drying or dehydrating the slurry formed in the previous process to manufacture useful products containing carbonized material in which the tobermorite crystal minerals are intermixed.

3. The method for manufacturing useful products according to claim 1, wherein calcium phosphate is contained in the useful products when the organic waste contains phosphorus.

4. The method for manufacturing useful products according to claim 1, wherein the heavy metals are at least one selected from chromium, lead, cadmium, arsenic, mercury, zinc, copper, and nickel.

5. The method for manufacturing useful products according to claim 1, wherein an amount (A-1) of Ca component and an amount (A-2) of $SiO_2$ component in the organic waste containing mixed heavy metals are determined by analyzing the content of Ca component and the content of $SiO_2$ component (A-1) in the waste, calculating amounts of a Ca component (B-1) and a $SiO_2$ component (B-2) sufficient to form $5CaO \cdot 6SiO_2 \cdot 5H_2O$ crystals (tobermorite) to contain at least the aforementioned heavy metals in the $5CaO \cdot 6SiO_2 \cdot 5H_2O$ crystals (tobermorite) structure during treatment, and wherein a required amount (C-1) of Ca component raw material and a required amount (C-2) of SiO2 component raw material are determined by the following formulas (1) and (2), and wherein the treatment is performed by using the required amount (C-1) of Ca component raw material and the required amount (C-2) of $SiO_2$ component raw material, $$[(B-1)-(A-1)] = (C-1) \quad \text{formula (1)}$$

$$[(B-2)-(A-2)] = (C-2). \quad \text{formula (2)}$$

6. The method for manufacturing useful products according to claim 1, wherein since the heavy metals are sequestered in the $5CaO \cdot 6SiO_2 \cdot 5H_2O$ crystals (tobermorite) in the useful products obtained by the above treatment, the useful products satisfy all soil environmental criteria and/or all special fertilizer criteria.

7. The method for manufacturing useful products according to claim 1, wherein during the carbonized material formation process, the organic wastes are stirred.

8. The method for manufacturing useful products according to claim 1, wherein the dry carbonizing step is performed in a rotary kiln type processing unit.

9. The method for manufacturing useful products according to claim 1, wherein the heating temperature in the dry carbonization process is 500-600° C.

10. The method for manufacturing useful products according to claim 2, wherein calcium phosphate is contained in the useful products when the organic waste contains phosphorus.

11. The method for manufacturing useful products according to claim 2, wherein the heavy metals are at least one selected from chromium, lead, cadmium, arsenic, mercury, zinc, copper, and nickel.

12. The method for manufacturing useful products according to claim 2, wherein the amount (A-1) of Ca component and the amount (A-2) of $SiO_2$ component in the organic waste containing mixed heavy metals are determined by analyzing the content of Ca component and the content of $SiO_2$ component (A-1) in the waste, calculating amounts of a Ca component (B-1) and a $SiO_2$ component (B-2) sufficient to form $5CaO \cdot 6SiO_2 \cdot 5H_2O$ crystals (tobermorite) to contain at least the aforementioned heavy metals in the $5CaO \cdot 6SiO_2 \cdot 5H2O$ crystals (tobermorite) structure during treatment, and wherein a required amount (C-1) of Ca component raw material and a required amount (C-2) of SiO2 component raw material are determined by the following formulas (1) and (2), and wherein the treatment is performed by using the required amount (C-1) of Ca component raw material and the required amount (C-2) of $SiO_2$ component raw material, $$[(B-1)-(A-1)] = (C-1) \quad \text{formula (1)}$$

$$[(B-2)-(A-2)] = (C-2). \quad \text{formula (2)}$$

13. The method for manufacturing useful products according to claim 2, wherein since the heavy metals are sequestered in the $5CaO \cdot 6SiO_2 \cdot 5H_2O$ crystals (tobermorite) in the useful products obtained by the above treatment, the useful products satisfy all soil environmental criteria and/or all special fertilizer criteria.

14. The method for manufacturing useful products according to claim 2, wherein during the carbonized material formation process, the organic wastes are stirred.

15. The method for manufacturing useful products according to claim 2, wherein the dry carbonizing step is performed in a rotary kiln type processing unit.

16. The method for manufacturing useful products according to claim 2, wherein the heating temperature in the dry carbonization process is 500-600° C.

* * * * *